(No Model.) 3 Sheets—Sheet 3.

G. R. MOORE.
TELLURIAN.

No. 465,824. Patented Dec. 22, 1891.

WITNESSES.
James T. Ball.
Harry H. Aiken.

INVENTOR.
George R. Moore
by Teschemacher
Atty

UNITED STATES PATENT OFFICE.

GEORGE R. MOORE, OF WESTFORD, MASSACHUSETTS, ASSIGNOR OF ONE-HALF TO EDWARD A. MOORE, OF SAME PLACE.

TELLURIAN.

SPECIFICATION forming part of Letters Patent No. 465,824, dated December 22, 1891.

Application filed July 1, 1891. Serial No. 398,173. (No model.)

*To all whom it may concern:*

Be it known that I, GEORGE R. MOORE, a citizen of the United States, residing at Westford, in the county of Middlesex and State of Massachusetts, have invented certain Improvements in Tellurians, of which the following is a full, clear, and exact description, reference being had to the accompanying drawings, making part of this specification, in which—

Figure 1:
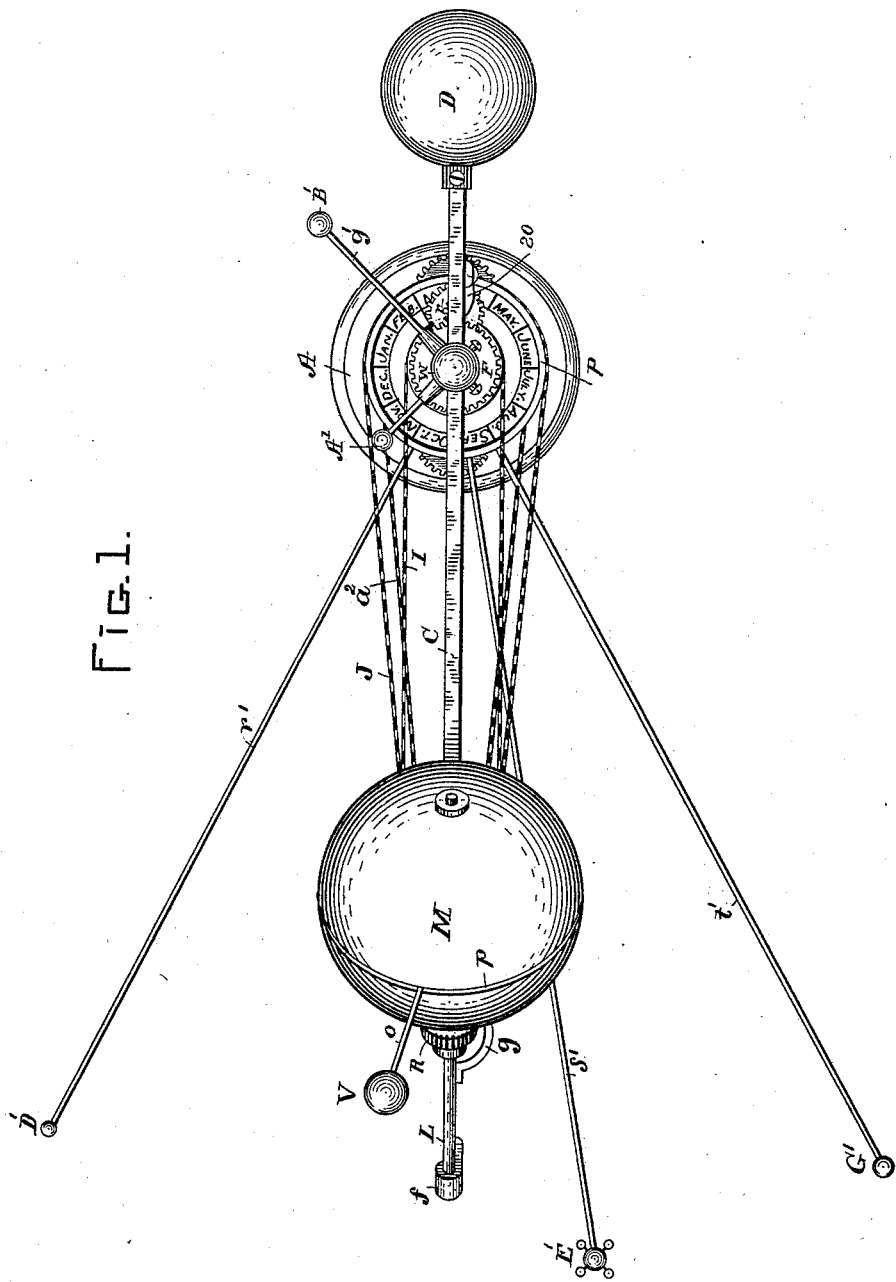
Figure 2:
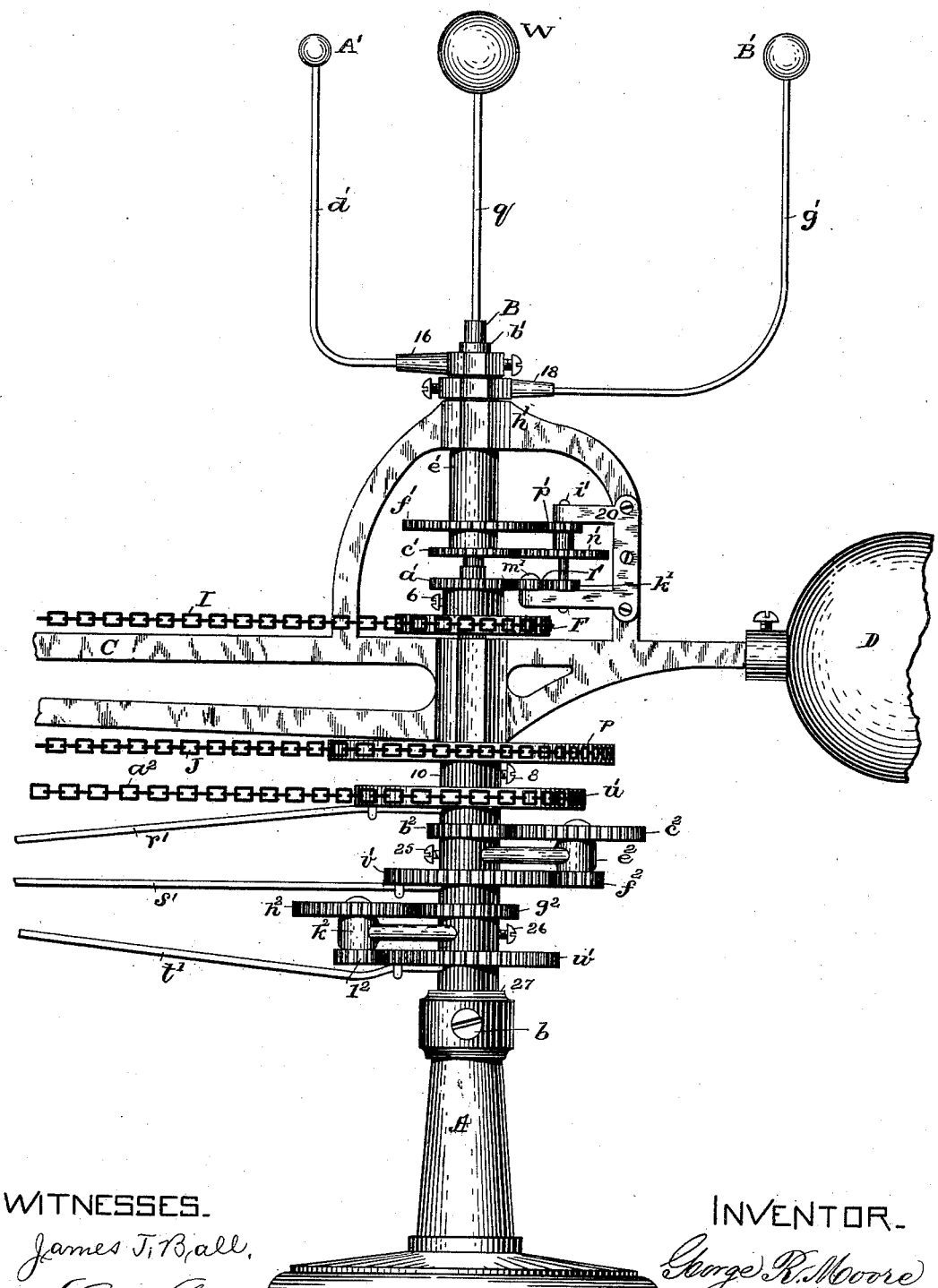
Figure 3:
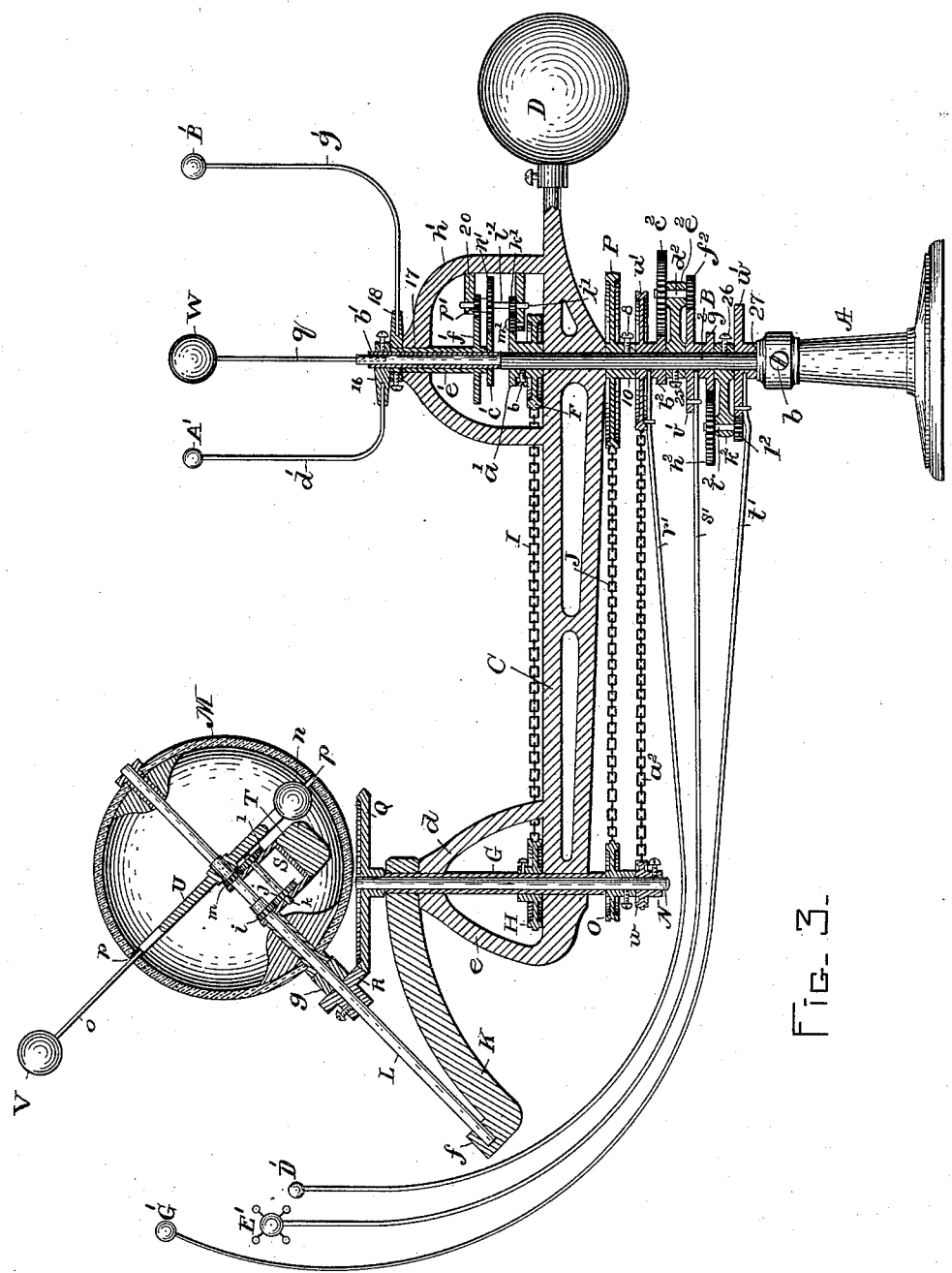

Figure 1 is a plan view of a tellurian embodying my invention. Fig. 2 is a side elevation of one end of the same. Fig. 3 is a longitudinal vertical section of the same.

My invention relates to certain improvements on the tellurian for which Letters Patent of the United States No. 452,413 were granted to me May 19, 1891, and has for its object to improve the construction of the apparatus whereby the periodical revolutions of the earth and the principal planets around the sun are shown to better advantage; and to this end my invention consists in certain novel devices and combinations of parts, as hereinafter more fully set forth, and specifically pointed out in the claims.

In the said drawings, A represents a base or stand, from which rises a vertical post or shaft B, secured in place by a set-screw b.

C is a frame applied to the shaft B and adapted to swing horizontally thereon, and D is an adjustable weight applied to the shorter arm of the frame C to counterbalance the longer arm of said frame and the appliances supported thereby.

Supported in bearings d e near the outer end of the longer arm of the frame C is a tubular shaft G, having a sprocket-wheel H secured thereto, around which passes a chain I, which also passes around a stationary sprocket-wheel F, secured to the shaft B by means of a set-screw 6, whereby as the frame C is swung around on the shaft B the shaft G will be rotated as desired. To the shaft G, near its top, is secured a curved arm K, provided with bearings f g for an inclined shaft L, to which is applied a globe M, representing the earth. Within the tubular shaft G is a shaft N, provided at its lower end with a sprocket-wheel O, around which and a larger stationary sprocket-wheel P passes a chain J, the wheel P being immovably secured to the shaft B by a set-screw 8, passing through its hub or collar 10, motion being thus communicated to the shaft N as the frame C is swung around on the shaft B by taking hold of the weight D with the hand or in any other suitable manner.

To the upper end of the shaft N is secured a horizontal bevel-gear Q, which engages a beveled pinion R, secured to the inclined shaft L. Within the globe M is a frame S, supported from the said shaft L, said frame being provided with a weight T. A pinion $i$, fixed to the shaft L, engages a gear $j$, fixed to a shaft $k$, supported in the frame S parallel to the shaft L and provided at its upper end with a gear $l$, which engages a sleeve-pinion $m$, adapted to turn on the shaft L, said pinion $m$ being fixed to an arm U, having a weight $n$ at one end and a rod $o$ at the other end, which supports a sphere V, representing the moon.

The globe M is divided into two hollow hemispheres, which are applied to the shaft L, so that there shall be a space $p$ between them for the rod $o$ to travel in when illustrating the motion of the moon V around the earth. A rod $q$, extending upward from the shaft B, supports at its top a sphere W representing the sun.

The parts thus far described are substantially the same in construction and mode of operation as those shown in my aforesaid patent of May 19, 1891, and I will now proceed to describe the additional features which form the subject of my present invention, said features consisting of the principal planets and the mechanism for supporting the same and producing their periodical revolutions around the sun.

To the vertical post B immediately above the sprocket-wheel F is immovably secured a gear $a'$, and above this gear $a'$ is fitted to revolve upon said post B a tubular shaft $b'$, having secured to its lower end a gear $c'$ and to its upper end a hub 16, to which is secured a curved wire $d'$, carrying at its outer upturned end a globe $A'$, representing the planet Mercury. Upon the outside of the tubular shaft $b'$ is fitted another tubular shaft $e'$, passing through a bearing 17 in the frame C and having secured to its lower end a gear $f'$, and to its upper end a hub 18, to which is secured a curved wire $g'$, carrying at its outer upturned end a globe B', representing Venus. The wire $g'$ extends out beyond the wire $d'$, and is so arranged that its globe B' will revolve around the sun-globe W in a circle outside the circle of rotation of the globe A'. These globes A' B' are rotated around the sun-globe W, each at its proper relative speed, in the following manner: From one side of the portion $h'$ of of the frame C projects a frame 20, in bearings, in which is supported a vertical shaft $i'$ carrying at its lower end a pinion $k'$, which meshes with a pinion $l'$, supported upon a stud $m'$, said pinion meshing with the stationary gear $a'$, secured to the shaft B, whereby, as the frame C is swung around on said shaft B the pinion $l'$ will be rotated and its motion communicated to the shaft $i'$ which carries near its upper end a gear $n'$, which meshes with the gear $c'$ of the sleeve $b'$, said shaft $i'$ also carrying at its upper end a pinion $p'$, which meshes with the gear $f'$ of the tubular shaft $e'$, and in this manner the proper movements are imparted to the globes A' B' to illustrate their motion around the sun-globe W, while the frame C is being turned in a horizontal plane to give the globe M a motion representing the motion of the earth around the sun. The axis of the earth-globe M is kept parallel to its former position in its rotation around the sun-globe W by the wheels F, H, chain I, tubular shaft G, and curved arm K, fixed to the shaft G, said arm K sustaining the inclined shaft L, the axis of which represents the axis of the earth.

The motion of the moon-globe V around the earth-globe M is produced by the rotation of the shaft N, gear Q, and pinions R and $i$, inclined shaft L, gears $j$ and $l$, shaft $k$, and pinion $m$, the latter fixed to the arm U, supporting the rod $o$, to which the moon-globe V is fixed. The motion of the globe M on its own axis is produced by the rotation of the shaft L driven through the medium of the connections described.

D' E' G' are globes representing, respectively, the planets Mars, Jupiter, and Saturn, said globes being mounted upon the upturned ends of three long wires $r'$ $s'$ $t'$, secured to three wheels $u'$ $v'$ $w'$, supported and adapted to turn upon the vertical shaft B, beneath the sprocket-wheel P. The wheel $u'$ is a sprocket-wheel, and is rotated by a chain $a^2$, which passes over a smaller sprocket-wheel $w$, fixed to the lower end of the shaft N. The wheels $v'$ $w'$ are toothed wheels or gears and are rotated at different speeds in the following manner: To the hub of the wheel $u'$ is secured a gear $b^2$, which meshes with a gear $c^2$, mounted on a short shaft $d^2$, supported in a bearing at the outer end of a stationary arm $e^2$, secured to the shaft B by a set-screw 25, this shaft $d^2$ carrying at its lower end a small gear $f^2$, which meshes with a large gear $v'$, carrying the wire $s'$. To the hub of the gear $v'$ is secured a small gear $g^2$, which meshes with a larger gear $h^2$ on a short shaft $i^2$, supported in a bearing at the outer end of a stationary arm $k^2$, also secured to the shaft B by a setscrew 26, said shaft $i^2$ carrying at its lower end a small gear $l^2$, which meshes with the gear $w'$, which carries the wire $t'$, the hub of the gear $w'$ resting upon a shoulder 27 at the top of the base A.

The upper surface of the sprocket-wheel P is graduated to represent different months or seasons of the year, and by means of the mechanism, arranged as above described, a very perfect illustration of the movements of the earth and planets in their several orbits around the sun can be afforded.

What I claim as my invention, and desire to secure by Letters Patent, is—

1. In a tellurian, the combination, for producing the rotation around the sun-globe W, of the globes A' and B', representing the planets Mercury and Venus, consisting of the vertical shaft B, the horizontally-swinging frame C, the stationary gear $a'$, secured to the shaft B, the tubular shafts $b'$ $e'$, placed upon the shaft B and revolving one within the other, the wires $d'$ $g'$, upon which said globes A' B' are mounted, said wires being secured to the shafts $b'$ $e'$, the gears $c'$ $f'$, secured to the shafts $b'$ $e'$, and the intermediate gearing mounted in the frame 20, attached to the frame C for transmitting motion by engagement with the stationary gear $a'$ to the gears $c'$ $f'$ and shafts $b'$ $e'$ as the frame C is rotated around the shaft B, substantially as set forth.

2. The combination of the base A, the vertical shaft B rising therefrom provided with sprocket-wheels F P, immovably secured thereto, the horizontally-swinging frame C, supported by and adapted to turn upon the shaft B, the tubular shaft G, mounted in the outer end of the frame C and provided with the wheel H, the shaft N, passing through the shaft G and carrying the sprocket-wheel O and gear Q, the chains I J, the arm K, secured to the shaft G and provided with bearings, the inclined shaft L, supported in said bearings, a globe M, representing the earth made in halves, supported on said shaft L and arranged with a space between them, a pinion R on the shaft L, engaging the gear Q, a moon-globe V, supported upon a rod or arm projecting through the space between the two halves of the globe M and operated by mechanism connected with the shaft L, the sunglobe W, supported from the shaft B, the tubular shafts $b'$ $e'$, placed upon the shaft B and revolving one within the other and provided with the gears $c'$ $f'$, the globes A' B', mounted upon the wires $d'$ $g'$, secured, respectively, to the shafts $b'$ $e'$, the stationary gear $a'$, secured to the shaft B, a train of intermediate gearing mounted in a frame 20, attached to the frame C, whereby motion is transmitted by engagement with the gear $a'$ to the gears $c'$ $f'$, and tubular shafts $b'$ $c'$, as the frame C is rotated around the shaft B, substantially as described.

3. In a tellurian, the combination, with the base A, the shaft B, having the sun-globe W mounted thereon, and the horizontally-swinging frame C, carrying at its outer end the earth-globe M, of the wheels $u'$ $v'$ $w'$, the wires $r'$ $s'$ $t'$, secured thereto and carrying at their outer upturned ends the globes D' E' G', representing the planets Mars, Jupiter, and Saturn, said wheels transmitting motion from one to the other by gearing, substantially as described, whereby said globes D' E' G' are revolved around the sun-globe W, the shaft N and its sprocket-wheels $w$ O, the chain $a^2$, passing over said wheel $w$ and the wheel $u'$, the stationary sprocket-wheel P on the shaft B, and the chain J, passing over said wheels P and O, all arranged to operate substantially as described.

4. In a tellurian, the combination, with the base A, the shaft B, having the sun-globe W mounted thereon, and a horizontally-swinging frame C, carrying at its outer end the earth-globe M, as described, of the wheels $u'$ $v'$ $w'$, the wires $r'$ $s'$ $t'$, secured thereto and provided at their outer upturned ends with the globes D' E' G', the gears $b^2$ $g^2$, the stationary arms $e^2$ $k^2$, secured to the shaft B, the shafts $d^2$ $i^2$, and the gears $c^2$ $f^2$ $h^2$ $l^2$, the shaft N and its sprocket-wheels $w$ O, the chain $a^2$, stationary wheel P on the shaft B and the chain J, the wires $d'$ $g'$, the globes A' B', mounted thereon, the shafts $b'$ $e'$, placed upon the shaft B and revolving one within the other and having the wires $d'$ $g'$ secured thereto, a stationary gear $a'$, secured to the shaft B, and gearing, substantially as described, for transmitting motion by engagement with the gear $a'$ and the shafts $b'$ $e'$, and wires $d'$ $g'$, secured thereto, whereby the globes A' B' are revolved around the sun-globe W, all supported and arranged to operate substantially as set forth.

Witness my hand this 22d day of June, A. D. 1891.

GEORGE R. MOORE.

In presence of—
P. E. TESCHEMACHER,
HARRY W. AIKEN.